(12) United States Patent
Robbins

(10) Patent No.: US 8,144,693 B1
(45) Date of Patent: Mar. 27, 2012

(54) METHOD AND SYSTEM FOR PROVIDING TELEMETRY, VERIFICATION AND/OR OTHER ACCESS IN A SIP-BASED NETWORK

(75) Inventor: David C Robbins, Grafton, MA (US)

(73) Assignee: Verizon Services Organization Inc., Irving, TX (US)

( * ) Notice: Subject to any disclaimer, the term of this patent is extended or adjusted under 35 U.S.C. 154(b) by 1131 days.

(21) Appl. No.: 11/534,228

(22) Filed: Sep. 22, 2006

Related U.S. Application Data

(60) Provisional application No. 60/719,465, filed on Sep. 22, 2005.

(51) Int. Cl.
*H04L 12/66* (2006.01)
(52) U.S. Cl. ................................. 370/352; 370/401
(58) Field of Classification Search .............. 370/496, 370/410, 260, 395, 468, 401; 709/204
See application file for complete search history.

(56) References Cited

U.S. PATENT DOCUMENTS

| | | |
|---|---|---|
| 3,737,587 A | 6/1973 | Romero |
| 4,154,987 A | 5/1979 | Rosenberg et al. |
| 4,528,424 A | 7/1985 | Middleton et al. |
| 4,723,271 A | 2/1988 | Grundtisch |
| 4,741,024 A | 4/1988 | Del Monte et al. |
| 4,950,011 A | 8/1990 | Borcea et al. |
| 5,165,095 A | 11/1992 | Borcherding |
| 5,323,444 A | 6/1994 | Ertz et al. |
| 5,471,519 A | 11/1995 | Howe et al. |
| 5,619,561 A | 4/1997 | Reese |
| 5,815,550 A | 9/1998 | Miller |
| 5,835,570 A | 11/1998 | Wattenbarger |
| 5,913,166 A | 6/1999 | Buttitta et al. |
| 5,970,134 A | 10/1999 | Highland et al. |
| 5,999,610 A | 12/1999 | Lin et al. |
| 6,021,176 A | 2/2000 | McKendry et al. |
| 6,026,156 A | 2/2000 | Epler et al. |
| 6,031,896 A | 2/2000 | Gardell et al. |
| 6,072,865 A | 6/2000 | Haber et al. |
| 6,208,726 B1 | 3/2001 | Bansal et al. |
| 6,219,414 B1 | 4/2001 | Maciejewski et al. |
| 6,337,898 B1 | 1/2002 | Gordon |
| 6,339,639 B1 | 1/2002 | Henderson |
| 6,404,876 B1 | 6/2002 | Smith et al. |

(Continued)

OTHER PUBLICATIONS

Rosenberg et al. "RFC 3261, SIP: Session Initiation Protocol", The Internet Society, Jun. 2002.

(Continued)

*Primary Examiner* — Steven H Nguyen

(57) ABSTRACT

A method and system of an embodiment of the present invention may involve receiving an invite message at a network port of a device to initiate a communication session with the device; identifying an address associated with the invite message; when the address corresponds to a first address, performing a first session initiation process to establish first communications via an audio port of the device; and when the address corresponds to a second address, performing a second session initiation process to establish second communications via the audio port of the device; wherein the second session initiation process differs from the first session initiation process. In addition, access to the audio port may involve determining a priority of the invite message; rejecting the invite message when the priority of the invite message is inferior relative to a priority of a current dialog; and accepting the invite message when the priority of the invite request is superior to the priority of the current dialog.

21 Claims, 7 Drawing Sheets

U.S. PATENT DOCUMENTS

| | | | |
|---|---|---|---|
| 6,484,196 B1 | 11/2002 | Maurille | |
| 6,510,315 B1 | 1/2003 | Arnson | |
| 6,636,594 B1 | 10/2003 | Oran | |
| 6,735,295 B1 | 5/2004 | Brennan et al. | |
| 6,741,695 B1 | 5/2004 | McConnell et al. | |
| 6,744,877 B1 | 6/2004 | Edwards | |
| 6,754,325 B1 | 6/2004 | Silver et al. | |
| 6,801,604 B2 | 10/2004 | Maes et al. | |
| 6,807,259 B1 | 10/2004 | Patel et al. | |
| 6,834,048 B1 | 12/2004 | Cho et al. | |
| 6,856,616 B1 | 2/2005 | Schuster et al. | |
| 6,857,072 B1 | 2/2005 | Schuster et al. | |
| 6,870,830 B1 | 3/2005 | Schuster et al. | |
| 6,876,632 B1 | 4/2005 | Takeda | |
| 6,879,673 B2 | 4/2005 | Creamer et al. | |
| 6,954,521 B2 | 10/2005 | Bull et al. | |
| 6,954,524 B2* | 10/2005 | Gibson | 379/211.02 |
| 6,961,332 B1 | 11/2005 | Li et al. | |
| 6,963,633 B1 | 11/2005 | Diede et al. | |
| 6,996,605 B2* | 2/2006 | Low et al. | 709/204 |
| 7,020,130 B2* | 3/2006 | Krause et al. | 370/352 |
| 7,031,700 B1 | 4/2006 | Weaver et al. | |
| 7,082,193 B2 | 7/2006 | Barclay et al. | |
| 7,085,253 B2 | 8/2006 | Yang | |
| 7,130,282 B2 | 10/2006 | Black | |
| 7,145,997 B2 | 12/2006 | Poikselka et al. | |
| 7,203,293 B1 | 4/2007 | Bedingfield | |
| 7,224,792 B2 | 5/2007 | Fusco | |
| 7,257,837 B2* | 8/2007 | Xu et al. | 726/12 |
| 7,260,201 B2 | 8/2007 | Jorasch et al. | |
| 7,274,662 B1 | 9/2007 | Kalmane et al. | |
| 7,283,517 B2* | 10/2007 | Yan et al. | 370/352 |
| 7,290,288 B2 | 10/2007 | Gregg et al. | |
| 7,295,577 B2* | 11/2007 | Moody et al. | 370/496 |
| 7,301,913 B2* | 11/2007 | Corrao et al. | 370/260 |
| 7,406,696 B2 | 7/2008 | Burger et al. | |
| 7,426,265 B2 | 9/2008 | Chen et al. | |
| 7,440,440 B1 | 10/2008 | Abichandani et al. | |
| 7,460,657 B1 | 12/2008 | Baeza | |
| 7,489,771 B2 | 2/2009 | McMurry et al. | |
| 7,580,497 B2* | 8/2009 | Wang et al. | 375/374 |
| 7,593,389 B2 | 9/2009 | Vance | |
| 7,599,355 B2* | 10/2009 | Sunstrum | 370/352 |
| 7,609,700 B1* | 10/2009 | Ying et al. | 370/395.21 |
| 7,609,706 B2* | 10/2009 | Scott et al. | 370/410 |
| 7,630,481 B2 | 12/2009 | Kafka | |
| 7,715,413 B2* | 5/2010 | Vaziri et al. | 370/401 |
| 7,743,141 B2* | 6/2010 | Wang et al. | 709/224 |
| 7,773,581 B2* | 8/2010 | Punj et al. | 370/352 |
| 7,860,089 B2 | 12/2010 | Tripathi et al. | |
| 2002/0038388 A1 | 3/2002 | Netter | |
| 2002/0114318 A1 | 8/2002 | Rines | |
| 2002/0131447 A1 | 9/2002 | Krishnamurthy et al. | |
| 2002/0136359 A1 | 9/2002 | Stumer et al. | |
| 2002/0136363 A1 | 9/2002 | Stumer et al. | |
| 2002/0141548 A1 | 10/2002 | Boda | |
| 2003/0028806 A1 | 2/2003 | Govindarajan et al. | |
| 2003/0043992 A1 | 3/2003 | Wengrovitz | |
| 2003/0088421 A1 | 5/2003 | Maes et al. | |
| 2003/0231759 A1 | 12/2003 | Bedingfield, et al. | |
| 2004/0030750 A1 | 2/2004 | Moore et al. | |
| 2004/0051900 A1 | 3/2004 | Sagiya et al. | |
| 2004/0082324 A1 | 4/2004 | Ayoub | |
| 2004/0090954 A1 | 5/2004 | Zhang et al. | |
| 2004/0148395 A1 | 7/2004 | Schulzrinne | |
| 2004/0207724 A1 | 10/2004 | Crouch et al. | |
| 2004/0240656 A1 | 12/2004 | Poustchi | |
| 2004/0249951 A1 | 12/2004 | Grabelsky et al. | |
| 2004/0264406 A1 | 12/2004 | Pattenden et al. | |
| 2005/0013421 A1 | 1/2005 | Chavez et al. | |
| 2005/0043014 A1 | 2/2005 | Hodge | |
| 2005/0069104 A1 | 3/2005 | Hanson et al. | |
| 2005/0078642 A1 | 4/2005 | Mayer et al. | |
| 2005/0123104 A1 | 6/2005 | Bishop et al. | |
| 2005/0129219 A1 | 6/2005 | Williamson | |
| 2005/0147227 A1 | 7/2005 | Chervirala et al. | |
| 2005/0190721 A1 | 9/2005 | Pershan | |
| 2005/0193338 A1 | 9/2005 | Hawkins et al. | |
| 2005/0195802 A1 | 9/2005 | Klein et al. | |
| 2005/0201530 A1 | 9/2005 | Koch et al. | |
| 2005/0213716 A1 | 9/2005 | Zhu et al. | |
| 2005/0215243 A1 | 9/2005 | Black et al. | |
| 2005/0226217 A1 | 10/2005 | Logemann et al. | |
| 2005/0237978 A1 | 10/2005 | Segal | |
| 2005/0249196 A1* | 11/2005 | Ansari et al. | 370/352 |
| 2005/0286466 A1* | 12/2005 | Tagg et al. | 370/329 |
| 2006/0033809 A1 | 2/2006 | Farley | |
| 2006/0039389 A1 | 2/2006 | Burger et al. | |
| 2006/0062210 A1 | 3/2006 | Dharanikota | |
| 2006/0062251 A1* | 3/2006 | Lim et al. | 370/468 |
| 2006/0067300 A1 | 3/2006 | Poustchi et al. | |
| 2006/0067504 A1 | 3/2006 | Goldman et al. | |
| 2006/0140379 A1 | 6/2006 | Yamamoto et al. | |
| 2006/0140380 A1 | 6/2006 | Croak et al. | |
| 2006/0146737 A1 | 7/2006 | Sandgren et al. | |
| 2006/0177030 A1 | 8/2006 | Rajagopalan et al. | |
| 2006/0177044 A1 | 8/2006 | O'Neil et al. | |
| 2006/0178130 A1 | 8/2006 | Makrygiannis | |
| 2006/0203986 A1 | 9/2006 | Gibson | |
| 2006/0218283 A1 | 9/2006 | Jones et al. | |
| 2006/0221176 A1* | 10/2006 | Di Pietro et al. | 348/14.08 |
| 2006/0251229 A1 | 11/2006 | Gorti et al. | |
| 2006/0285533 A1 | 12/2006 | Divine et al. | |
| 2006/0286984 A1* | 12/2006 | Bonner | 455/445 |
| 2007/0025270 A1 | 2/2007 | Sylvain | |
| 2007/0058613 A1 | 3/2007 | Beckemeyer | |
| 2007/0083658 A1 | 4/2007 | Hanna et al. | |
| 2007/0092073 A1 | 4/2007 | Olshansky et al. | |
| 2007/0111723 A1 | 5/2007 | Ahmed et al. | |
| 2007/0143858 A1 | 6/2007 | Hearty | |
| 2008/0049724 A1 | 2/2008 | Tsujino et al. | |
| 2008/0126549 A1* | 5/2008 | Khanchandani et al. | 709/227 |

OTHER PUBLICATIONS

Newton's Telecom Dictionary 22nd Edition, p. 829, Feb. 2006.

Sparks, "RFC 3515—The Session Initiation Protocol (SIP) Refer Method," The Internet Society, Apr. 2003.

Mahy et al., "RFC 3891—The Session Initiation Protocol (SIP) 'Replaces' Header," The Internet Society, Sep. 2004.

Mahy et al, "RFC 3911—The Session Initiation Protocol (SIP) 'Join' Header," The Internet Society, Oct. 2004.

Handley et al., "RFC 2327—SDP: Session Description Protocol," The Internet Society, Apr. 1998.

Schulzrinne et al., "RFC 1889—RTP: A Transport Protocol for Real-Time Applications," The Internet Society, Jan. 1996.

Schulzrinne et al., "RFC 2833—RTP Payload for DTMF Digits, Telephony Tones and Telephony Signals," The Internet Society, May 2000.

Mahy et al., "draft-ietf-sip-join-03—The Session Initiation Protocol (SIP) "Join" Header," The Internet Society, Feb. 2004.

Mahy et al., "draft-ietf-sipping-cc-framework-03—A Call Control and Multi-party usage framework for the Session Initiation Protocol (SIP)," The Internet Society, Oct. 27, 2003.

Rosenberg, "RFC 3311—The Session Initiation Protocol (SIP) Update Method," The Internet Society, Sep. 2002.

Rosenberg et al., "RFC 3262—Reliability of Provisional Responses in the Session Initiation Protocol (SIP)," The Internet Society, Jun. 2002.

Jennings et al., "RFC 3325—Private Extensions to the Session Initiation Protocol (SIP) for Asserted Identity within Trusted Networks," The Internet Society, Nov. 2002.

Harrington et al., "RFC 3411—An Architecture for Describing Simple Network Management Protocol (SNMP) Management Frameworks," The Internet Society, Dec. 2002.

Rosenberg et al., "RFC 3840—Indicating User Agent Capabilities in the Session Initiation Protocol (SIP)," The Internet Society, Aug. 2004.

Mahy, "RFC 3842—A Message Summary and Message Waiting Indication Event Package for the Session Initiation Protocol (SIP)," The Internet Society, Aug. 2004.

"SR-504: SPCS Capabilities and Features," Telcordia Technologies, Issue 1, Mar. 1996.

"SR-3065: LSSGR Guide," Telcordia Technologies, Issue 7, Aug. 2003.

Mahy et al., "draft-ietf-sip-replaces-05—The Session Initiation Protocol (SIP) "Replaces" Header," The Internet Society, Feb. 16, 2004.

Schulzrinne, "draft-ietf-sipping-sos-00—Emergency Services URI for the Session Initiation Protocol," The Internet Society, Feb. 8, 2004.

Rosenberg et al., "draft-ietf-sipping-dialog-package-04—An Invite Inititiated Dialog Event Package for the Session Initiation Protocol (SIP)," The Internet Society, Feb. 13, 2004.

Lingle et al., "draft-ietf-sip-mib-08—Management Information Base for Session Initiation Protocol (SIP)," The Internet Society, Jul. 16, 2004.

Johnston et al., "draft-ietf-sipping-cc-conferencing-04—Session Initiation Protocol Call Control—Conferencing for User Agents," The Internet Society, Jul. 18, 2004.

Sparks et al., "draft-ietf-sipping-cc-transfer-02—Session Initiation Protocol Call Control—Transfer," The Internet Society, Feb. 15, 2004.

Rosenberg et al., "draft-ietf-sipping-conference-package-04—A Session Initiation Protocol (SIP) Event Package for Conference State," The Internet Society, May 21, 2004.

"GR-1298-CORE—AINGR: Switching systems," Telcordia Technologies, Issue 6, Nov. 2000.

* cited by examiner

METHOD AND SYSTEM FOR PROVIDING TELEMETRY, VERIFICATION AND/OR OTHER ACCESS IN A SIP-BASED NETWORK

CROSS-REFERENCE TO RELATED APPLICATIONS

This patent application claims priority to U.S. Provisional Patent Application No. 60/719,465, filed Sep. 22, 2005, which is hereby incorporated by reference herein in its entirety.

BACKGROUND INFORMATION

Session Initiation Protocol (SIP) is a call control signaling protocol for Internet Protocol (IP) networks. SIP is designed to be device-agnostic—that is, it is intended to provide a highly flexible call signaling capability that is not tailored to the capabilities of any particular device. Analog telephone signaling, on the other hand, is device-specific and highly constrained because of the historical legacy of the services delivered to the device. As a result, many call features available in traditional analog telephone devices are not easily integrated in a SIP-based network.

BRIEF DESCRIPTION OF THE DRAWINGS

In order to facilitate a fuller understanding of the exemplary embodiments of the present inventions, reference is now made to the appended drawings. These drawings should not be construed as limiting, but are intended to be exemplary only.

DETAILED DESCRIPTION OF PREFERRED EMBODIMENTS

A system and process of an exemplary embodiment of the present invention provides the ability to recognize distinct contact addresses and invoke specific behavior based on the distinct contact addresses and further interact with normal voice calls.

Figure 1:
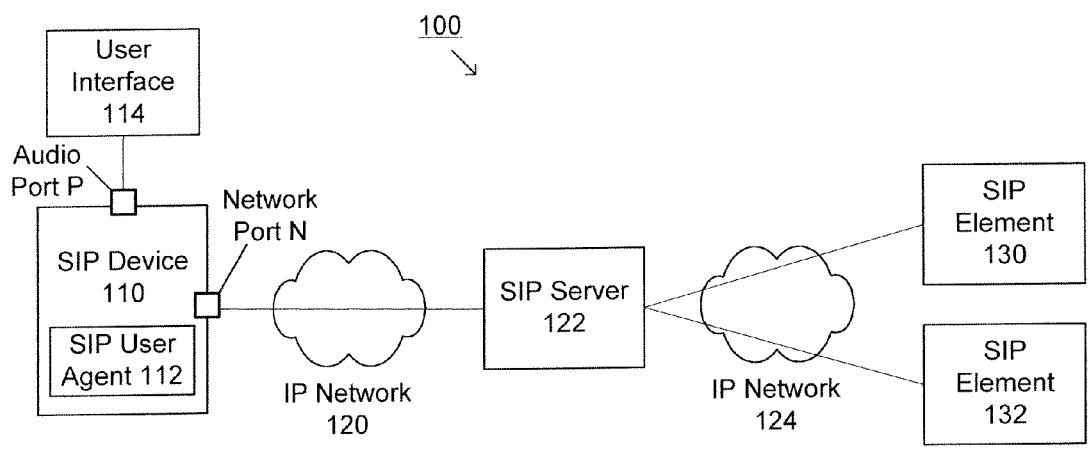
FIG. 1 is an exemplary SIP-based network system, according to an embodiment of the present invention.

FIG. 1 is an exemplary SIP-based network system, according to an embodiment of the present invention. System 100 illustrates an exemplary system for supporting SIP communication, in particular providing access to a SIP device based on a contact address associated with an invite request. As illustrated, SIP Device 110 may be coupled to User Interface 114. SW Device 110 may include a SIP User Agent 112 for communicating across IP Network 120 to a SIP Server 122. SIP Server 122 may provide communication to other SIP devices, as shown by SIP Element 130 and SIP element 132, through IP Network 124. The various components of system 100 may be further duplicated, combined and/or integrated to support various applications and platforms. Additional elements may also be implemented in the system to support various applications. A SIP-based network may also include an IP network, packet switched based network or other type of network. The elements referred to in the Figures may include other network or packet switched based elements. For example, the elements referred to as "SIP" may include other network devices, elements, components, etc.

SIP Device 110 may represent a device that manages User Interface 114. User Interface 114 may include a traditional telephone and other data communication device using voiceband or other signaling, including but not limited to data modems, facsimile devices, teletype (TTY) equipment, etc. SIP Device 110 may contain SIP User Agent 112. SIP User Agent 112 may be integrated with SIP Device 110 or remote from SIP Device 110. SIP User Agent 112 may perform interworking between SIP signaling and user interface actions. For example, SIP User Agent 112 may manage an exchange of media (e.g., audio, etc.) between User Interface 114 and a Real Time Protocol (RTP) media stream of a media session set up by the SIP signaling. SIP Device 110 may originate calls to and receive calls from other users. SIP Device 110 may communicate through IP Network 120 to SIP Server 122. In addition, SIP Device 110 may include a Network Port N for communicating through IP Network 120 and an Audio Port P for communication with User Interface 114.

SIP Server 122 may represent a SIP proxy or application server that acts on behalf of SIP Device 110. For example, SIP Server 122 may manage a SIP Address of Record (AOR) on behalf of SIP Device 110. SIP Device 110 may register with SIP Server 122 and send SIP signaling through SIP Server 122 to other SIP elements, such as SIP Element 130 and SIP Element 132. For example, a call to the SIP AOR may be delivered to SIP Server 122, which in turn delivers the call to SIP Device 110. SIP Server 122 may perform some service on behalf of SIP Device 110, or may simply forward SIP messages to and from SIP Device 110. SIP Device 110 communicates through IP Network 124 to SIP Element 130 and/or SIP Element 132.

SIP Element 130 and SIP Element 132 may represent users with which the user of SIP Device 110 communicates. SIP Element may be a SIP Device, SIP Server, and/or other SIP enabled device. In addition, SIP Element may also represent a PSTN device that may be reached by a gateway that, directly or indirectly, acts as a SIP User Agent.

According to an embodiment of the present invention, SIP Device 110 may recognize various distinct contact addresses and provide corresponding distinct modes of access to Audio Port P. Access may include normal voice calling, verification access, test access, telemetry access and/or other access. In addition, priority rules may be implemented to grant access based on relative priorities determinations when a request is received during an established dialog.

Figure 2:
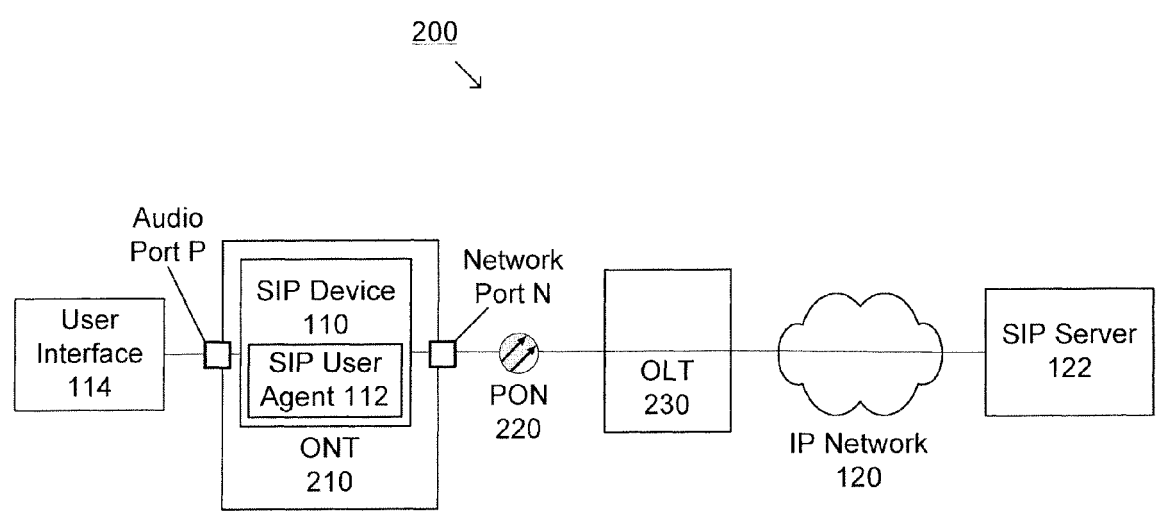
FIG. 2 illustrates an exemplary implementation where a SIP Device is embedded in a FTTP network, according to an embodiment of the present invention.
Figure 3:
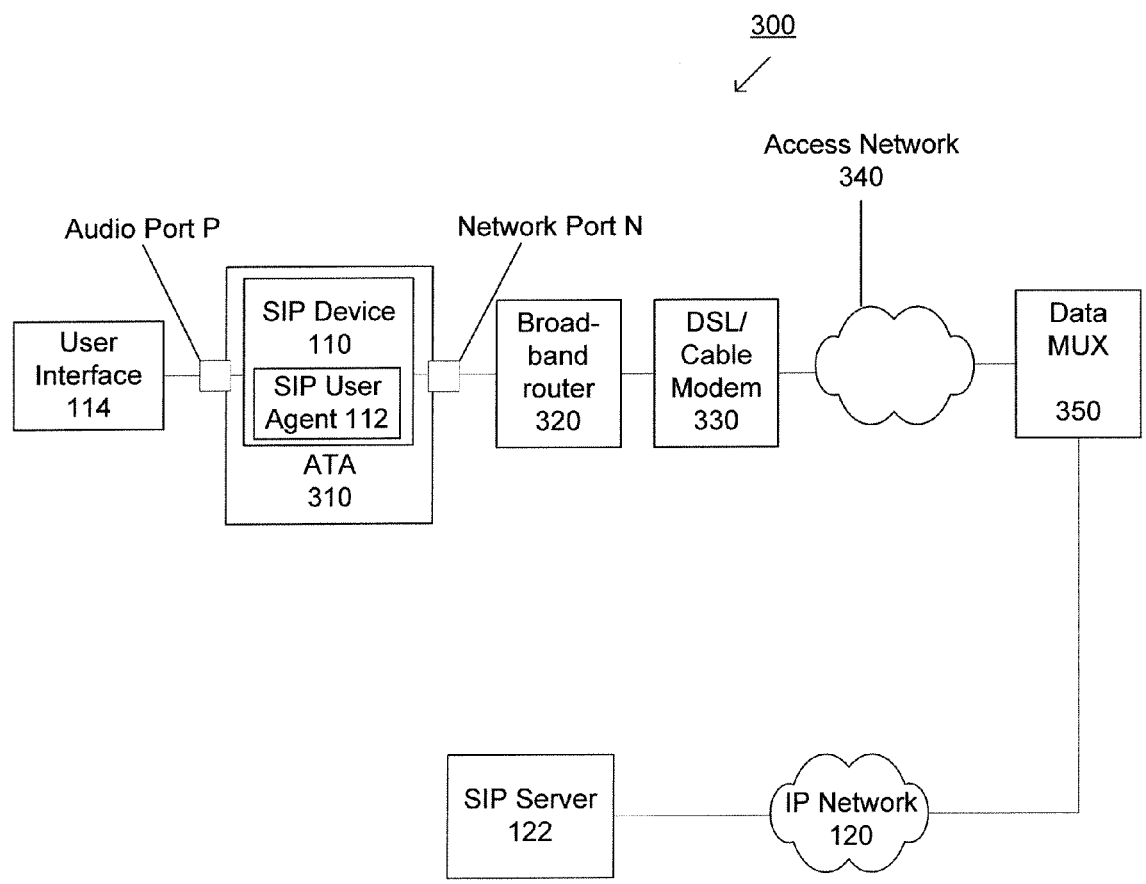
FIG. 3 illustrates an exemplary implementation where a SIP Device is embedded in an ATA device connected to an IP network, according to an embodiment of the present invention.

FIGS. 2 and 3 show exemplary implementations of a SIP Device. FIG. 2 illustrates an exemplary implementation where a SIP Device is used in connection with a Fiber-to-the-Premises (FTTP) network, according to an embodiment of the present invention. FIG. 3 illustrates an exemplary implementation where a SIP Device is embedded in an Analog Telephone Adapter (ATA) which is used in connection with a traditional (e.g., electrical) IP-enabled access network, according to an embodiment of the present invention. Other implementations with other devices and/or networks may also be realized.

As shown in FIG. 2, User Interface 114 may be connected to SIP Device 110. SIP Device 110 may be embedded in Optical Network Terminal (ONT) 210 or otherwise integrated. ONT 210 may be connected to an Optical Line Terminal (OLT) 230 via a Passive Optical Network (PON) 220 acting as an access network for communications between ONTs 210 and OLTs 230. According to an exemplary application, OLT 230 may be located at a Central Office. ONT 210 may be connected over PON 220 to the OLT 230, which in turn passes that connection through transport IP network 120 to SIP Server 122. According to an exemplary application, OLT 230 may maintain an IP connection between SIP Device 110 on the ONT 210 and the transport IP network 120. In this exemplary application, the OLT 230 may not process SIP signaling, but rather allows SIP signaling to pass through to its destination.

FIG. 3 illustrates SIP Device 110 embedded in an Analog Telephone Adapter (ATA) 310 in a home or other location that subscribes to a broadband service delivered via an access network, such as DSL or cable modem service. The ATA device may be attached to a network, such as a broadband data network, IP network and/or other network. User Interface 114 may be connected to SIP Device 110. ATA 310 may be connected to Broadband Router 320, which in turn may be connected to a DSL or cable modem 330, which in turn may be connected to access network 340. Access network 340 may provide connectivity to transport IP network 120 through which the SIP Device 110 may communicate with SIP Server 122. In one example, as shown in FIG. 3, data multiplexer (MUX) 350 may provide a point of connection for transmissions between access network 340 and the transport IP network 120.

The various components of systems 200 and 300 as shown in FIGS. 2 and 3 may be further duplicated, combined and/or integrated to support various applications and platforms. Additional elements may also be implemented in the systems described above to support various applications.

In an Internet Protocol (IP) network using the Session Initiation Protocol (SIP) for voice call control signaling, it may be desired to provide the equivalent of test, verification, and telemetry access to an analog telephone line (or equivalent) managed by a SIP User Agent. Such access may involve exchange of audio signals with the line, without normal call control signaling (e.g., power ringing, loop closure, etc.). An embodiment of the present invention provides a method and system for using SIP signaling to provide such access. Instead of relying upon protocols other than SIP, or on non-standard SIP extensions, an embodiment of the present invention may involve a SIP User Agent recognizing distinct contact addresses as having certain properties that invoke behavior appropriate for test, verification, telemetry and/or other access to an analog line. Further, an embodiment of the present invention minimizes and/or eliminates undesirable interactions with normal voice calls.

In the public switched telephone network (PSTN), an analog line that is normally used for originating and receiving voiceband telephone calls may at times also be accessed from the network for alternate purposes other than handling calls. Such alternative purposes may include test access, telemetry, busy line verification and/or other purposes. Test access may involve providing a connection from a test trunk to a subscriber line, for various manual and/or automatic testing purposes. Telemetry access may involve providing a connection to a telemetry device that shares a subscriber line (e.g., remote meter reading, etc.). Busy line verification access may involve providing a connection from a verification operator to a subscriber line for the purpose of determining whether there is conversation on a busy line or other activity. In addition, busy verification access may provide the ability for the operator to break into a call. These functions may be provided by a central office switch to loop-start analog lines.

The PSTN is evolving from its legacy technology base of analog and time-division multiplex (TDM) transport and signaling to a technology base using Internet Protocol (IP) transport and signaling protocols. However, the IP-based network will continue to support legacy analog subscriber equipment (e.g., analog phones, faxes, modems). A mechanism for supporting analog equipment in the IP network may include a line media gateway deployed at the "edge" of the network, which uses IP signaling protocols that may be designed specifically for the gateway application. Gateway signaling protocols may operate at a relatively low level, and may thus easily support the functions of test access, busy line verification, telemetry and/or other alternate purposes with respect to analog subscriber equipment.

As IP signaling reaches more edge devices, SIP may be implemented as a call control signaling protocol for analog subscriber devices. For example, SIP signaling may meet analog subscriber equipment at devices such as Integrated Access Devices, Analog Telephone Adapters, and Optical Network Terminals. Such devices may manage one or more connections to analog devices, and may contain SIP User Agents that perform the translation between the analog line signaling expected by such analog devices and SIP protocol messages. In addition, SIP may also replace gateway control protocols in line media gateways. In contrast with gateway control protocols, which may be described as device control protocols, SIP may be considered a relatively high-level call control protocol.

As SIP is generally independent of the particular device used to originate and receive a call, SIP is typically not designed to provide direct access to an audio port of an edge device (e.g., the analog line) for purposes such as testing, busy line verification, or telemetry. An embodiment of the present invention provides audio port access for alternate purposes using standard SIP signaling.

An embodiment of the present invention may involve a device with a port to an analog user interface and a port to a network. The device may include SIP Device 110 which may include SIP User Agent 112, as shown in FIG. 1. A first port, as shown by Audio Port P, may be connected to one or more analog user interfaces, such as User Interface 114. For example, User Interface 114 may include telephones or other communication devices, through which a user originates and receives calls as well as perform other form of communication. In addition, Audio Port P may also connect to one or more devices that may not be typically used to originate or receive calls, but may communicate using voiceband and/or other signaling to perform various functions, such as test, verification, telemetry, etc. A second port, as shown by Network Port N, may be connected to network 120, which may include intermediate nodes (e.g., routers, switches, etc.). Network Port N may permit communication with a remote SIP element over network 120. The remote SIP element may in fact be a point of connection to a network composed of many elements. For example, the remote SIP element may include a SIP Server 122, a proxy server, an application server, a User Agent and/or other devices, including a SIP enabled device and/or other network enabled device. The remote SIP element may originate calls to and receive calls from SIP Device 110 using SIP signaling, such as described below. Using the method described in accordance with the various embodiments of the present inventions and embodied in SIP User Agent 112 in SIP Device 110, the remote SIP element may also obtain access to Audio Port P for various purposes including testing, busy line verification, telemetry and/or other purposes.

SIP Device 110 may contain more than one Audio Port P, each such port capable of supporting at least one associated User Interface 114. While the description and Figures illustrate a single audio port, additional audio ports, devices and/or components may be implemented. In addition, an Audio Port P may communicate with additional devices, such as multiple user agents, if such a configuration is desired. Further, the various elements may be further integrated, combined and/or separated across multiple components. Other architectures and scenarios may be implemented.

According to an exemplary scenario associated with a typical voice communication session, a remote SIP element may originate a call or other communication session to SIP Device 110. The process may begin with a SIP INVITE E message sent from the remote SIP element to SIP User Agent 112 in SIP Device 110. The SIP INVITE message may be received by SIP Server 122 with which the SIP Device 110 has registered. The SIP Server 122 may perform address mapping and/or some admission control actions and forward the SIP INVITE to SIP Device 110. Upon receiving the INVITE message, SIP User Agent 112 may alert the user by some form of signaling transmitted through Audio Port P to one or more user interfaces connected to Audio Port P, which may include an attached communication device. When alerting begins, SIP User Agent 112 may send a "180 Ringing" message to the remote SIP element. The user may respond by performing an action such as picking up a handset or other acknowledgement. The action may then cause the user interface to transmit a signal through Audio Port P to SIP User Agent 112. In response, SIP User Agent 112 may send a "200 OK" message to the remote SIP element. The remote SIP element may then send an acknowledgement, e.g., ACK message, to SIP User Agent 112. During the INVITE/200 OK/ACK exchange with SIP User Agent 112, the remote SIP element may agree on audio session parameters. Upon reaching an agreement, the remote SIP element may exchange audio (or other data) between the device(s) attached to Audio Port P and an equivalent device at the remote SIP element. SIP User Agent 112 may track the state of the resulting call session. Eventually, one party may end the call by taking an action that results in a BYE message being sent. The element receiving the BYE message may respond with a "200 OK" message. A call originated by SIP Device 110 may begin with the user performing an initiation action, such as picking up a handset and dialing a number, whereupon SIP User Agent 112 in SIP Device 110 sends an INVITE message to SIP element. The call proceeds as described above, with SIP element and SIP Device 110 swapping roles.

The SIP User Agent 112 may manage more than one dialog simultaneously on behalf of Audio Port P. If multiple dialogs exist, some may be "on hold" and others may be "active." If more than one dialog is active, the audio for the dialogs may be mixed, thereby forming a conference. Audio Port P may support a single audio stream or multiple audio streams which may be switched from one dialog or a set of dialogs to another dialog or another set of dialogs. Accordingly, in SIP Device 110, Audio Port P may have no dialogs, one dialog or more multiple voice dialogs at any given time.

As noted above, a SIP dialog initiated by a SIP INVITE may correspond to a call and/or other form of communication between and/or among SIP devices and/or other communication devices. In the preferred embodiments described herein, a SIP dialog may not only include a typical voice dialog, but also a test dialog, a verification dialog, a telemetry dialog and/or other one-way or multiple-way communication of data specific to user interface equipment. In the preferred embodiment, SIP User Agent 112 may register a contact address with a "registrar" function in a SIP element (e.g., SIP Server 122). The contact address represents a unique address to which normal calls may be delivered. SIP User Agent 112 may also register alternate contact addresses associated with functionality supported by SIP Device 110 for interfacing with Audio Port P. For example, SIP User Agent 112 may register with its associated SIP Server 122 an address "A" which it may use for voice calling, an address "T" which it may use for telemetry sessions, and an address "V" which it may use for test/verification sessions. SIP User Agent 112 will interpret SIP INVITE E messages directed to these addresses as requests for the special sessions that require alternate treatment, as further described below. Other addresses may also be used to represent other access, purpose or function, if such are provided by SIP Device 110.

According to an exemplary application, test, verification, and telemetry access may be initiated by a remote SIP element and directed to the appropriate alternate SIP address associated with the SIP Device 110. Upon receipt of the SIP INVITE directed to the alternate SIP address, SIP User Agent 112 may initiate an alternative session establishment process which accommodates the unique functionality of the requested service. For example, a test, telemetry or verification dialog may utilize means other than the usual and customary means for alerting and/or answering at analog devices connected to the Audio Port P of the SIP Device 110. For example, the dialog may be established without providing a "ringing" signal to the user interface device—which may allow a telemetry device (or other device) attached to the Audio Port P to "answer" and communicate data. In addition, a test, telemetry or verification dialog may have a priority relationship with respect to other dialogs, such that it may be rejected in favor of other dialogs, and may also preempt or be preempted by other dialogs. Further, a test, telemetry or verification dialog may join with another dialog that is active, or may become active, at the audio port of the device. Other types of dialog may be established in accordance with the various embodiments of the present invention.

The preferred embodiments described herein may thus provide access to the audio ports of a SIP Device 110 via a SIP-established session, which may occur without disrupting the normal calling activities of the user and may accommodate the specific requirements of analog subscriber equipment.

Figure 4:
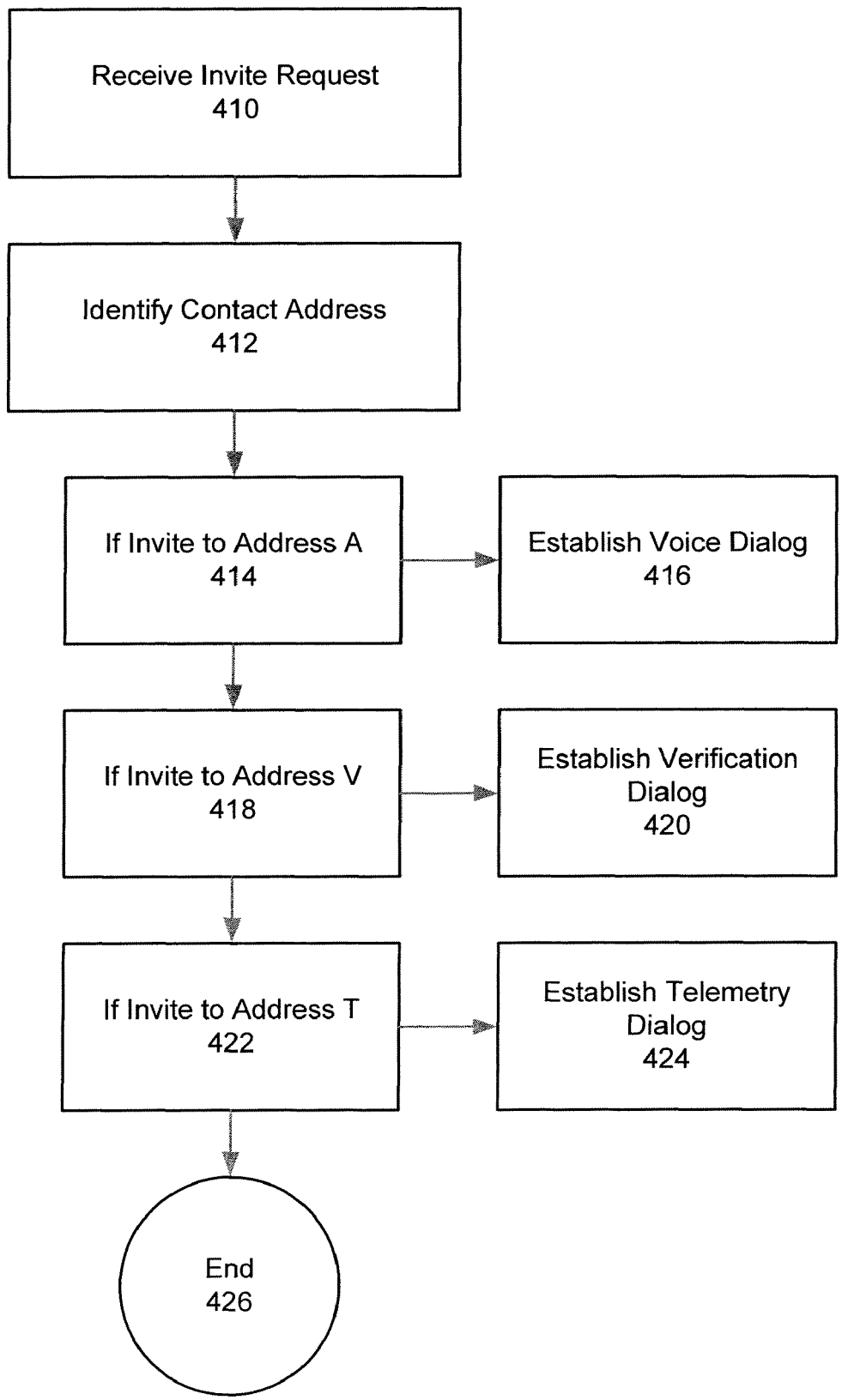
FIG. 4 is an exemplary flowchart illustrating a method for determining access to an audio port based on contact addresses, according to an embodiment of the present invention.

FIG. 4 is an exemplary flowchart illustrating a method for determining access to an audio port based on contact addresses, according to an embodiment of the present invention. At step 410, an INVITE request may be received at a device, such as a SIP User Agent 112 in SIP Device 110. The INVITE request may be specific to a particular contact address. The contact address may include an address or any other identifier. At step 412, a corresponding service supported by the SIP Device 110 may be identified for the contact address in the received INVITE request. For example, an INVITE to address "A" may be recognized as a request for a voice dialog at step 414. As a result, a voice dialog may be established as shown by step 416, in a manner that is well known. An INVITE to address "V" may be recognized as request for a verification dialog at step 418 and a verification dialog may be established as shown by step 420 (further described below). An INVITE to address "T" may be recognized as a request for a telemetry dialog at step 422 and a telemetry dialog may be established at step 424 (further described below). In addition, an embodiment of the present invention may receive INVITE messages to other addresses which may correspond to other services available on SIP Device 110 that have special processing requirements and/or provide other access. Step 426 represents an end of the process.

According to an embodiment of the present invention, priority rules may be implemented. The priority rules may apply when a request to establish a new dialog is received while a dialog is currently established. The existing dialog may be active, on hold or other status. For example, test and verification access to Audio Port P may involve connecting to an audio stream at Audio Port P regardless of the number of voice dialogs associated with Audio Port P. If no voice dialog is currently associated with Audio Port P, the test/verification audio stream may be a bidirectional exchange of audio with Audio Port P. If a voice dialog exists, then the test/verification audio stream may be mixed with the audio stream that exists between Audio Port P and a far end of the dialog. According to another example, telemetry access may involve a bidirectional exchange of audio with Audio Port P, making telemetry access to Audio Port P mutually exclusive with voice dialogs. Priority rules may arbitrate establishment of voice and telemetry dialogs in such cases. Other priority rules and/or conditions may also be applied.

Figure 5:
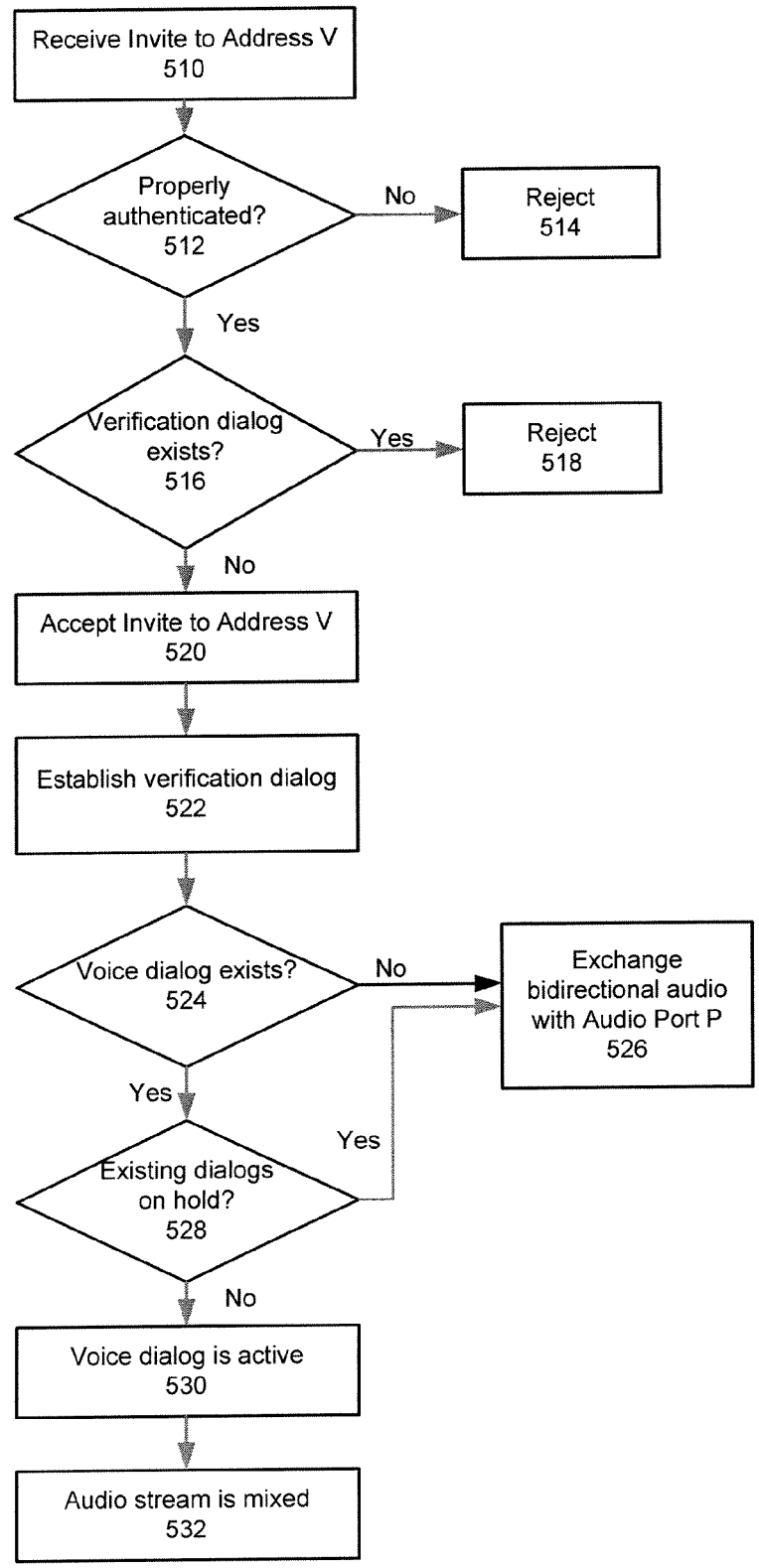
FIG. 5 is an exemplary flowchart illustrating a test and/or verification process, according to an embodiment of the present invention.

FIG. 5 is an exemplary flowchart illustrating a test and/or verification process, according to an embodiment of the present invention. At step 510, an INVITE to address V may be received. The INVITE to address V may be transmitted from a remote SIP element and received by a SIP User Agent in a SIP device which, for example, has registered address V as an address at which test/verification sessions with the Audio Port P associated with the SIP user Agent may be directed. It may be determined whether the INVITE to address V is properly authenticated, at step 512. If it is not properly authenticated, the INVITE to address V may be rejected, at step 514. At step 516, it may be determined whether a verification dialog already exists associated with Audio Port P. If so, the INVITE may be rejected. In addition, other determinations may be made and the INVITE may be rejected for other reasons.

If a verification dialog does not already exist, the INVITE to address V may be accepted at step 520. In addition, the INVITE to address V may be accepted at step 520 regardless of the existence of any voice dialogs. Once the INVITE to address V is accepted, a signaling process associated with test/verification processing may be executed in the course of establishing a test/verification session. For example, standard "ringing" signaling may not be provided on Audio Port P, but rather a media session for a verification dialog may be established, as shown by step 522, thus allowing for test/verification signals to be applied at Audio Port P. If a voice dialog does not exist, as determined at step 524, or any existing voice dialogs are on hold, as determined by step 528, the media session established for the verification dialog may exchange bidirectional audio with Audio Port P, at step 526. If one or more voice dialogs are active, as determined by step 530, audio streams may be mixed, as shown by step 532, such that the verification dialog receives audio from Audio Port P and active voice dialogs, and transmits audio to Audio Port P and active voice dialogs.

Figure 6:
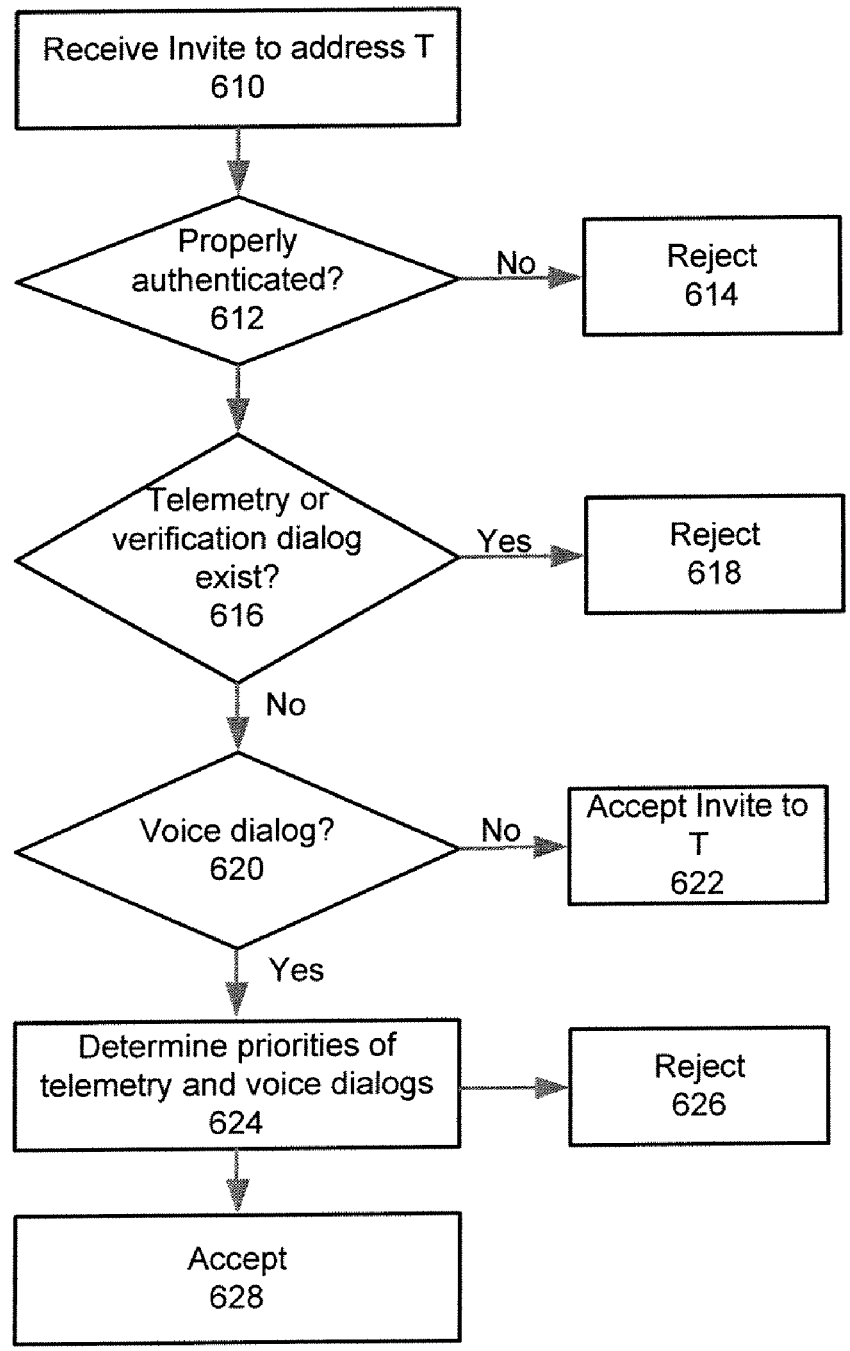
FIG. 6 is an exemplary flowchart illustrating a telemetry process, according to an embodiment of the present invention.

FIG. 6 is an exemplary flowchart illustrating a telemetry process, according to an embodiment of the present invention. At step 610, an INVITE to address T may be received. The INVITE to address T may be transmitted from a remote SIP element and received by a SIP User Agent in a SIP device which, for example, has registered address T as an address at which telemetry sessions with Audio Port P associated with the SIP User Agent may be directed. It may be determined whether the INVITE to address T is properly authenticated, at step 612. If not properly authenticated, the INVITE to address T may be rejected, at step 614. At step 616, it may be determined whether a telemetry or verification dialog already exists. If so, the INVITE to address T may be rejected, at step 618. In addition, other determinations may be made and the INVITE may be rejected for other reasons. It may be determined whether a voice dialog exists, at step 620. If not, the INVITE to address T may be accepted at step 622. If a voice dialog exists, a determination of priorities between the current request and any existing dialogs may be initiated, at step 624. Based on the priorities, the INVITE may be rejected at step 626 or accepted at step 628. If the INVITE to address T is accepted, a signaling process associated with telemetry processing may be executed in the course of establishing a telemetry session. For example, standard "ringing" signaling may not be provided on Audio Port P, but rather specialized electrical signaling may applied at Audio Port P as may be expected by a telemetry device. If a telemetry dialog is established (e.g., the telemetry device responds), an associated media session may exchange bidirectional audio with Audio Port P.

Figure 7:
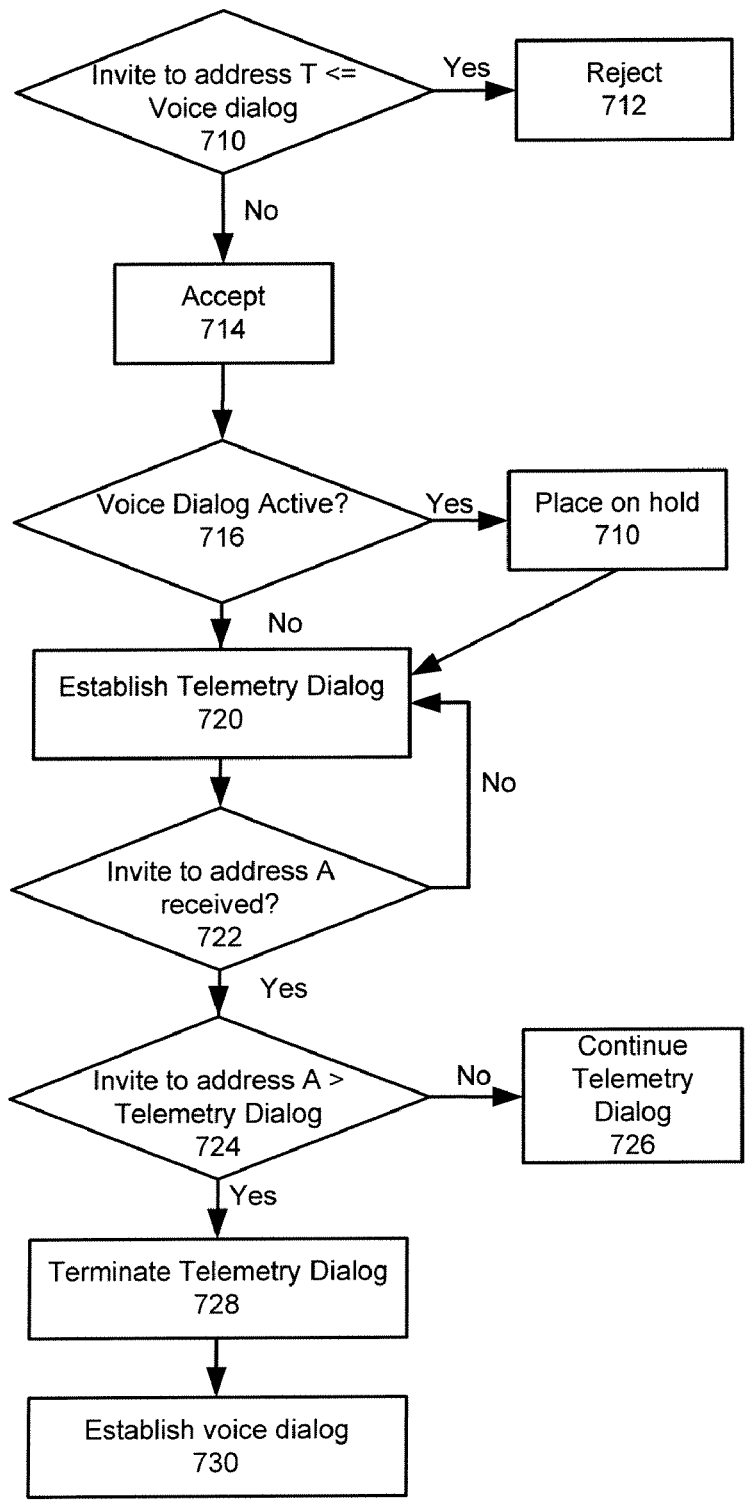
FIG. 7 is an exemplary flowchart illustrating a determination of relative priorities between dialogs, according to an embodiment of the present invention.

FIG. 7 is an exemplary flowchart illustrating a determination of relative priorities between dialogs, according to an embodiment of the present invention. The relative priorities of telemetry and voice dialogs may determine which dialog takes precedence. The priority of a dialog may be specified by a "Priority" field in the header of the INVITE message that establishes the dialog. If a "Priority" field is not present, the priority may default to "normal" or other predetermined default. FIG. 7 illustrates an exemplary determination of priorities between or among dialogs. Other relative priorities may be established.

For example, when an INVITE to address T is received while one or more voice dialogs exist, a determination of priorities may be made. At step 710, if the priority associated with the INVITE to address T is less than or equal to that of at least one existing voice dialog, the INVITE to address T may be rejected, as shown in step 712. According to an exemplary application, an INVITE to address T may have a lower priority than a voice dialog. However, if the INVITE to address T has a higher priority than existing voice dialogs, the INVITE to address T may be accepted at step 714. If the voice dialog is active, as determined by step 716, the active voice dialog may be placed on hold at step 718 and a telemetry dialog may be established as shown by step 720. At this point, the user may not activate a voice dialog until the telemetry dialog ends. According to another example, an INVITE to address A may be received at step 722 during a time period when a telemetry dialog exists. The corresponding priorities of the requested call session and the existing telemetry session may be similarly compared. If the priority of the INVITE to address A is greater than the priority of the telemetry dialog as shown by step 724, the telemetry dialog may be terminated at step 728 and the voice dialog may be established at step 730. Otherwise, the telemetry dialog may continue as shown by step 726, and the INVITE to address A may be rejected. Other priorities may be implemented in accordance with the various embodiments of the present invention.

While the processes of FIGS. 4, 5, 6 and 7 illustrate certain steps performed in a particular order, it should be understood that the embodiments of the present invention may be practiced by adding one or more steps to the processes, omitting steps within the processes and/or altering the order in which one or more steps are performed.

By recognizing the various distinct contact addresses, User Agent 112 in SIP Device 110 may provide corresponding distinct modes of access to Audio Port P, which may include normal voice calling, verification access, test access, telemetry access and/or other access. According to an embodiment of the present invention, User Agent 112 may provide these functions utilizing standard SIP signaling. As a result, SIP extensions are not required, non-standard protocols are not required, and protocols beyond those used for normal voice calling are not required. According to an exemplary application, standard SIP signaling may be used for providing verification, telemetry access and/or other access.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

The invention claimed is:

1. A method, comprising:
receiving an invite message at a network port of a device to initiate a communication session with the device;
identifying an address associated with the invite message;
when the address corresponds to a first address, performing a first session initiation process to establish first communications via an audio port of the device; and
when the address corresponds to a second address, performing a second session initiation process to establish second communications via the audio port of the device;
wherein the second session initiation process differs from the first session initiation process in that the first session initiation process includes providing an alert signal at the audio port in response to receiving the invite message while the second session initiation process does not provide the alert signal in response to receiving the invite message.

2. The method of claim 1, wherein the first communications are two-way audio communications and the second communications are one of telemetry communications and test/verification communications.

3. The method of claim 1, wherein the device comprises a SIP device with a user agent, and the invite message comprises a SIP INVITE message.

4. The method of claim 1, wherein the network port comprises a packet switched network interface.

5. The method of claim 1, wherein an analog user interface is coupled to the audio port of the device.

6. The method of claim 1, further comprising:
determining a priority of the invite message;
rejecting the invite message when the priority of the invite message is inferior relative to a priority of a current dialog; and
accepting the invite message when the priority of the invite message is superior to the priority of the current dialog.

7. A Non-transitory computer readable media comprising code to perform the acts of the method of claim 1.

8. A device, comprising:
an audio port that communicates with a user interface;
a network port that communicates with a remote element; and
a user agent that is configured to:
receive an invite message at the network port to initiate a communication session with the device;
identify an address associated with the invite message;
when the address corresponds to a first address, perform a first session initiation process to establish first communications via an audio port of the device; and
when the address corresponds to a second address, perform a second session initiation process to establish second communications via the audio port of the device;
wherein the second session initiation process differs from the first session initiation process in that the first session initiation process includes providing an alert signal at the audio port in response to receiving the invite message while the second session initiation process does not provide the alert signal in response to receiving the invite message.

9. The device of claim 8, wherein the remote element comprises a SIP server.

10. The device of claim 8, wherein the remote element comprises a remote SIP user agent.

11. The device of claim 8, wherein the first communications are two-way audio communications and the second communications are one of telemetry communications and test/verification communications.

12. The device of claim 8, wherein the device comprises a SIP device with a user agent, and the invite message comprises a SIP INVITE message.

13. The device of claim 8, wherein the network port comprises a packet switched network interface.

14. The device of claim 8, wherein an analog user interface is coupled to the audio port of the device.

15. The device of claim 8, wherein the user agent is configured to:
determine a priority of the invite message;
reject the invite message when the priority of the invite message is inferior relative to a priority of a current dialog; and
accept the invite message when the priority of the invite message is superior to the priority of the current dialog.

16. A method, comprising:
transmitting an invite message with an associated address;
wherein the invite message is transmitted to initiate a communication session with a device; and
accessing an audio port of the device based on the associated address;
wherein when the address corresponds to a first address, a first session initiation process is performed to establish first communications via the audio port of the device; and
wherein when the address corresponds to a second address, a second session initiation process is performed to establish second communications via the audio port of the device;
wherein the second session initiation process differs from the first session initiation process in that the first session initiation process includes providing an alert signal at the audio port in response to receiving the invite message while the second session initiation process does not provide the alert signal in response to receiving the invite message.

17. The method of claim 16, wherein the first communications are two-way audio communications and the second communications are one of telemetry communications and test/verification communications.

18. The method of claim 16, wherein the device comprises a SIP device with a user agent, and the invite message comprises a SIP INVITE message.

19. The method of claim 16, wherein the invite message is transmitted to a network port of the device, wherein the network port comprises a packet switched network interface.

20. The method of claim 16, wherein an analog user interface is coupled to the audio port of the device.

21. A Non-transitory computer readable media comprising code to perform the acts of the method of claim 16.

* * * * *